Jan. 11, 1966  C. T. PETERSEN  3,228,443
FREESTONE DRUPE PITTING METHOD
Filed Nov. 27, 1961  3 Sheets-Sheet 1
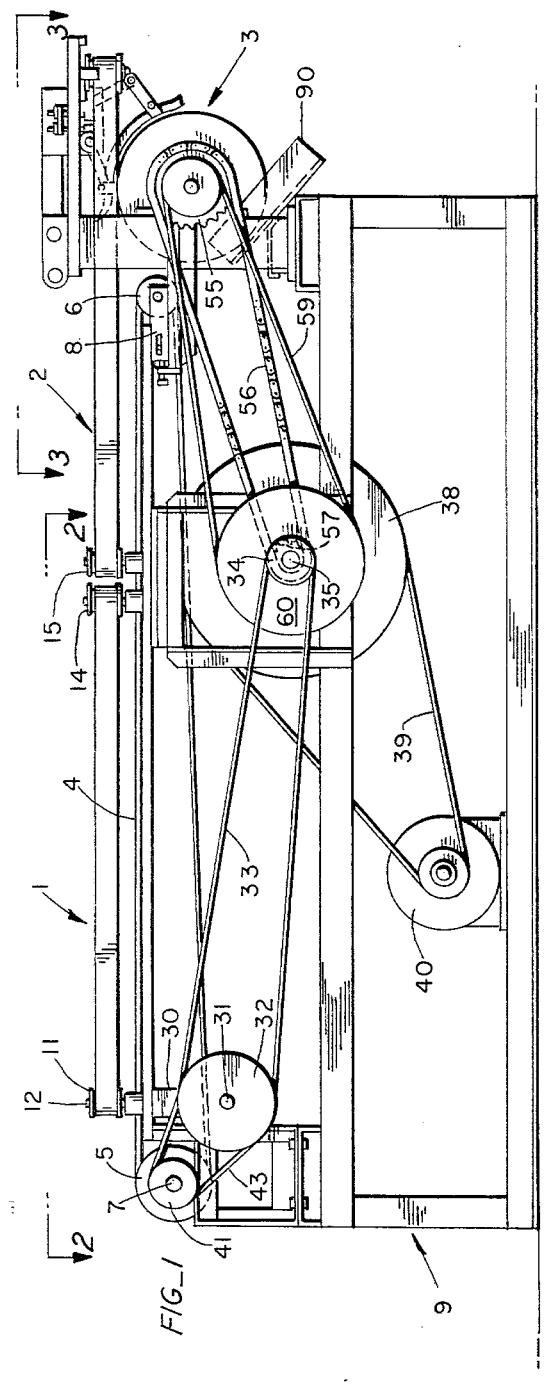
FIG_1
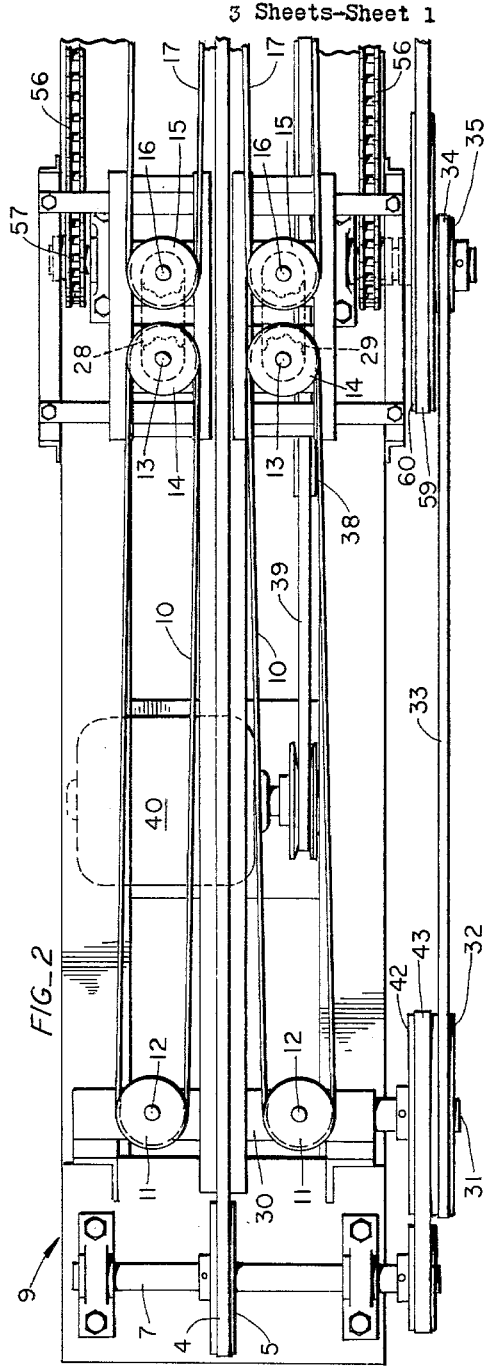
FIG_2
INVENTOR.
CARL T. PETERSEN
BY
Boyken, Mohler & Wood
ATTORNEYS Jan. 11, 1966  C. T. PETERSEN  3,228,443
FREESTONE DRUPE PITTING METHOD
Filed Nov. 27, 1961  3 Sheets-Sheet 2
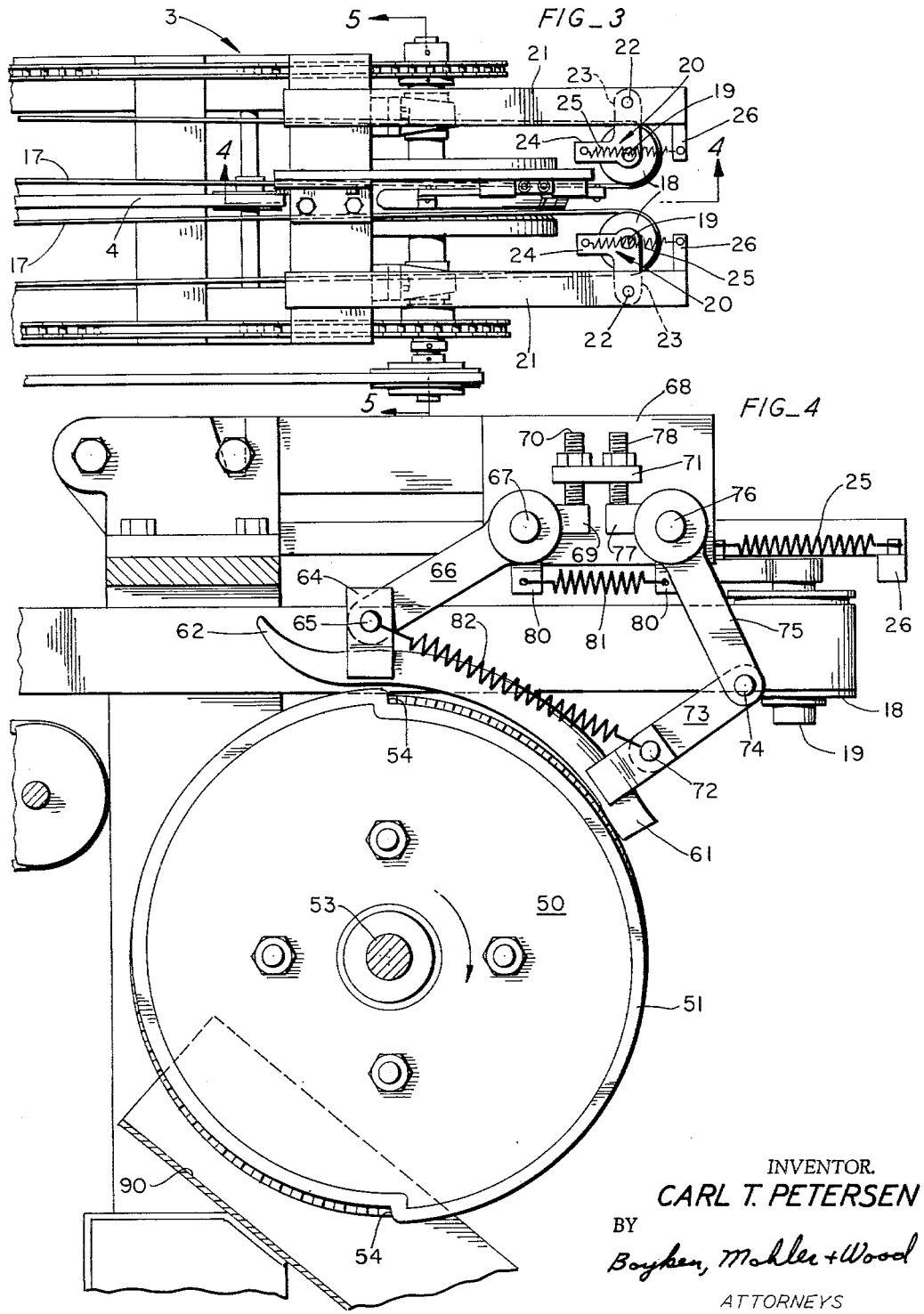
INVENTOR.
CARL T. PETERSEN
BY
Boyken, Mohler + Wood
ATTORNEYS

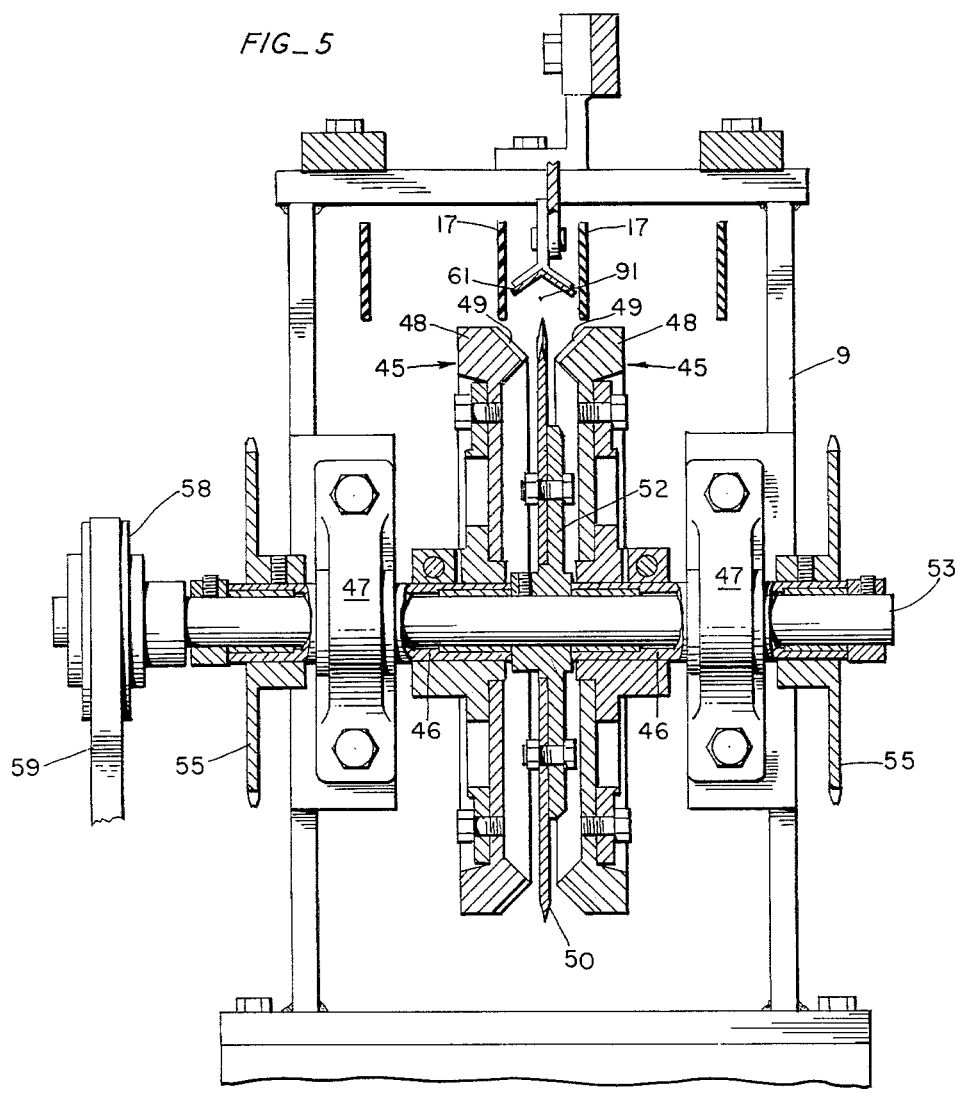

United States Patent Office 3,228,443
Patented Jan. 11, 1966

3,228,443
FREESTONE DRUPE PITTING METHOD
Carl T. Petersen, Lafayette, Calif., assignor to Filper Corporation, San Ramon, Calif.
Filed Nov. 27, 1961, Ser. No. 154,989
2 Claims. (Cl. 146—238)

This invention relates to a freestone drupe pitter and has for one of its objects the provision of a pitter that is adapted to more efficiently halve and pit freestone drupes than heretofore.

Heretofore, one of the difficulties in halving and pitting freestone drupes, such as apricots, as an example, has been that of completely freeing the pits from the halves without injury to the halves and with reduction in the capacity of the apparatus to halve and to pit the drupes.

One of the objects of this invention is the provision of a freestone drupe pitter that is adapted to half and to pit freestone drupes at a high rate of speed, and that completely separates the pits from the halves of the drupe bodies without injury to said halves.

An additional object of the invention is the provision of an improved method of pitting drupe halves in which the pits are positively removed from the halves without injury to the latter.

Briefly, heretofore, apricots (as an example of a drupe to be pitted) have been moved along a path of travel, past a circular or arcuately extending cutter that bisects the halves to the pit. In some instances the cutting edge of the cutter is inclined relative to the path of travel of the body of each apricot for causing the pit to move downwardly out of the halves. In other instances the apricots are rotated past a stationary cutter to bisect the body and a stationary obstacle is positioned in the path of the drupe to engage and to hold the pit while the halves are carried therepast.

In the present instance the apricot is bisected while moving in one direction and the pit is rapidly moved out of the leading end of the body after the cut is made, by application of force against the trailing end of the pit. The body is first cut at the side through which the pit is ejected and the halving is accomplished at substantially the same time, the pit moving in the same direction of the body and out of the body. The speed with which the pit is ejected completely eliminates any possibility of the pit hanging to one half or the other.

The pitting of ripe undried freestone prunes and other freestone drupes that are more difficult to pit than apricots, is readily accomplished by the present invention.

Other objects and advantages will appear in the description and drawings.

In the drawings, FIG. 1 is a side elevational view of a complete machine.

FIG. 2 is an enlarged top plan view of the feed end of the apparatus, and

FIG. 3 is an enlarged top plan view of the pitting end of the apparatus.

FIG. 4 is an enlarged cross sectional view taken along line 4—4 of FIG. 3.

FIG. 5 is an enlarged vertical cross sectional view taken along line 5—5 of FIG. 3.

Referring to FIG. 1 of the drawings, the numeral 1 generally designates the feed and drupe orienting portion of the machine. This is at the left hand end of FIG. 1, the direction of movement of the drupes that are to be pitted, being from left to right.

Adjacent to the feed and orienting portion, and to the right of the latter as seen in FIG. 1 is the drupe transfer portion, which is generally designated 2.

To the right of the transfer portion 2, and at the right hand end of the apparatus, as seen in FIG. 1 is the halving and pitting mechanism, that is generally designated 3.

These three portions could be called "stations" i.e., a feed and orienting station, a transfer station and a halving and pitting station. But, in actual practice, the movement of the drupes from left to right is fast and continuous. There is no stopping of the drupes at the stations. The drupes are moved in a single row through the apparatus, in a direction longitudinally of the row.

The portions 1, 2 and the bisecting and pitting mechanism are supported on a suitable frame 9. Said frame 9 is horizontally elongated and includes conventional cross pieces and legs for supporting the working parts spaced above the floor and in the desired relationship to each other.

Feed and orienting portion 1

A relatively narrow, horizontally extending belt 4 extends at one end over a pulley 5, that is at the left hand end of the apparatus, as seen in FIGS. 1, 2. This belt 4 extends at its opposite end over a pulley 6 that is carried on the frame within the transfer portion, as will later be explained more in detail.

Pulley 5 is secured on a horizontal shaft 7 that is rotatable in bearings supported on the left hand end of frame 9, and pulley 6 is carried on a shaft that is supported for rotation in adjustable bearings 8, the latter being movable toward the halving and pitting mechanism 3 for tightening said belt 4.

The upper run of belt 4 is supported on a horizontally elongated table against sagging, the latter being supported on frame 9, such structure being conventional where a belt support is required. The right hand end of belt 4, as viewed in FIG. 1, terminates short of the halving and pitting mechanism.

Projecting above belt 4, and spaced at opposite sides thereof, are a pair of horizontally spaced, opposed, endless belts 10 that are respectively supported at their ends for movement about vertical axes.

Pulleys 11 at the left hand end of the frame 9 are supported on the upper ends of vertical shafts 12 (FIG. 2) for rotation about the axes of said shafts upon rotation of the latter.

Vertical shafts 13 at the opposite or right hand ends of belts 10 carry pulleys 14 about which said opposite ends of belts 10 extend.

The right hand ends of belts 10 substantially define the point where the feed and orienting portion 1, and the transfer portion commences.

Transfer portion 2

Adjacent to pulleys 14 are a pair of similar pulleys 15, the latter being on the upper ends of vertical shafts 16. Vertically disposed, horizontally extending endless belts 17 extend at one of their ends over pulleys 15, and the opposite ends of said belts 17 extend over pulleys 18 (FIG. 3). Said pulleys 18 are carried on vertical shafts 19 that are at the right hand end of frame 9.

The adjacent opposed runs of belts 17 are generally in longitudinal alignment with the adjacent opposed runs of belts 10. However, the said opposed runs of belts 17 are closer to each other, and extend slightly convergently from pulleys 15 to pulleys 18.

Shafts 19 that support the right hand ends of belts 17, as seen in FIG. 3, extend between and are rotatably carried by horizontally disposed right angle bracket members that are generally designated 20. The bracket members 20 are in vertically opposed pairs with the shafts 19 at the junctures between the angularly extending arms of the bracket members.

Pivots 22 pivotally support the outer ends of one of the corresponding arms 23 of the bracket members 20 to the horizontally extending elongated side frame members 21 of frame 9, with said arms extending toward each other from pivots 22, and the other arms 24 of said bracket members extend from pulley shafts 19 to the left (as seen in FIG. 3) and toward the bisecting and pitting mechanism 3, since said belts 17 actually extend past the bisecting and pitting mechanism from pulleys 15.

Coil springs 25 connect the outer ends of arms 24 (which arms extend toward the bisecting and pitting mechanism) with projections 26 (FIG. 3) that are rigid with the right hand end of frame 9.

By the foregoing structure belts 17 are yieldably held in tension, and their adjacent runs are yieldably held apart a distance to insure sufficient frictional engagement with the opposite sides of drupes therebetween to carry drupes across the gap that exists between the bisecting and pitting mechanism, and the drupe supporting belt 4. This is why belts 17 are described as being a transfer portion.

Driving arrangement

The lower ends of shafts 13, 16 are supported for rotation in bearings carried by suitable cross frame members on frame 9, and sprocket wheels on the lower ends of shafts 13 are connected by chains 28, 29 (FIG. 2) with similar sprocket wheels on the lower ends of shafts 16.

At the left hand end of the feed and orienting portion 1, the shafts 12 that carry pulleys 11, extend into a gear box 30. Within box 30 suitable gears, not shown, connect the shafts 12 and a drive shaft 31 for driving shafts 12 in the proper direction for moving the adjacent runs of belts 10, 17 toward the pitting mechanism 3.

Shaft 31 carries a pulley 32 that, in turn, is connected by a belt 33 with a pulley 34 on the main drive shaft 35. Shaft 35, in turn, carries a large diameter pulley 38 that is connected by a belt 39 with motor 40 (FIGS. 1, 2).

The shaft 7 that carries the pulley 5 over which the left hand end of the drupe supporting belt 4 extends, also carries a pulley 41. Pulley 41 is connected with a pulley 42 (FIG. 2) by a belt 43. The pulley 42 is secured on shaft 31.

Orienting action

The driving arrangement for the belt 4 and belts 10, 17 is such that the belt 4 is driven toward the pitting mechanism 3 at a faster surface speed than that of belts 10, 17. This arrangement results in orienting drupes, such as apricots, that have major and minor axes at right angles to each other so that the minor axes are horizontal and at right angles to belts 10, 17. The sutures of the apricot bodies, and pits, are on the major axis, hence after orientation, said sutures will be in substantially a vertical plane bisecting the space between the adjacent runs of belts 10, 17.

At the left hand end of the machine, belts 10 are spaced apart a greater distance than at pulleys 13, so that the apricots or drupes may be readily fed onto belt 4 between pulleys 11, and as the drupes are carried toward the converging ends of belts 10, the adjacent, slower moving, opposed runs of the belts 10 will engage the opposite sides of the drupes to cause them to position themselves with their sutures in the vertical plane that bisects the space between said opposed runs. This action is the same as described in United States Letters Patent No. 2,745,453 that issued May 15, 1956 to Joseph Perrelli et al., and which is owned by the assignee of the present application.

In the present structure, the drupes are delivered from the right hand ends of belts 10 (as seen in FIG. 2), to between the transfer belts 17, and the latter carry the oriented drupes to the bisecting and pitting mechanism.

Bisecting and pitting mechanism 3

The bisecting and pitting mechanism comprises a pair of similar, coaxial, horizontally spaced wheels 45 (FIG. 5) that are centrally secured on the adjacent ends of a coaxial pair of horizontal, hollow shafts 46. Shafts 46, in turn, are supported for rotation in bearings 47 carried by frame 9.

Wheels 45 have rims 48 that are bevelled on generally radially outwardly facing sides to provide slanted surfaces 49 extending convergently toward each other and toward the axis of the shafts 46. These surfaces 49 provide a seat for centering each drupe that is delivered onto the upper sides of the wheels.

Centrally positioned between the wheels 45, and spaced therefrom is a cutter disc 50 (FIG. 5) the outer periphery of which is formed with a pair of generally spirally extending cutting edges 51 (FIG. 4).

The disc 50 is centrally secured on a hub 52 that, in turn, is secured on a central shaft 53 in a position between the adjacent ends of hollow shafts 46.

The spirally extending cutting edges 51 respectively extend half way around the outer peripheral edge of the disc (FIG. 4) and progressively radially inwardly, in the same direction, circumferentially of the disc, from points at opposite sides of the disc that are equal distances from the axis of the shaft 53.

The "inner" ends of the cutting edges are the ends that are closest to the axis of shaft 53, and the outer ends are the ends that are at the above mentioned points, or the ends farthest from said axis. The said outer ends extend sufficient distances radially outwardly of the space between rims 48 on wheels 45 to project into a drupe that is seated on surfaces 49 and past the central horizontal axis of the pit in such drupe.

A circumferentially facing shoulder or surface 54, defines the juncture between each of the adjacent inner and outer ends of the cutting edges 51. The inner end portion of each cutting edge 51 projects a sufficient distance radially outwardly of the space between the closest adjacent surfaces of rims 48 to cut into the body of a drupe seated on surfaces 49 in a plane vertically bisecting each such drupe in the plane of the cutter 50.

The shafts 46 carrying wheels 45 have sprocket wheels 55 (FIG. 5) secured on their outer ends. Sprocket chains 56 (FIG. 2) connect sprocket wheels 55 with sprocket wheels 57 that are on the outer ends of the main drive shaft 35.

A small diameter pulley 58 is secured on one end of shaft 53 on which the cutter disc 50 is secured, and a belt 59 connects this pulley with a much larger diameter pulley 60 secured on shaft 35.

The direction of rotation of both the wheels 45 and cutter 50 is in the same direction, so that their upper portions move in the same direction as the belts 17. The arrow in FIG. 4 indicates this direction of rotation.

Positioned over the surfaces 49 of wheels 45 is an arcuately extending hold-down guide 61. The cross sectional contour of this guide is that of an inverted V (FIG. 5) the center or apex being directly over and spaced above the cutter disc 50.

One end of the hold-down guide 61 is directed generally toward drupes that are being carried between belts 17 to the bisecting and pitting mechanism 3, and said end is curved upwardly, as at 62, so that drupes that are carried by and between belts 17 will pass below said end 62 and onto the seats or surfaces 49 at the uppermost sides of wheels 45.

Said hold-down guide extends from the end portion 62 progressively closer to the outer periphery of wheels 45, and it is supported in this position for yieldable movement of both ends, independently of each other, away from the wheels.

At the drupe receiving end of the hold-down guide which is the end 62, a bracket 64, projecting upwardly from said guide, is connected by a pivot 65 with one end of an arm 66. Arm 66 extends slantingly upwardly, and generally in the direction of movement of belts 17, and is pivotally supported on a pivot 67 that is carried by a plate 68 that, in turn, is rigid with the frame of the machine.

An arm 69 is secured to the end of arm 66 that is mounted on pivot 67, and this arm engages a vertically adjustable screw 70 that, in turn, threadedly extends through a bracket 71 secured to plate 68. Thus, the downward movement of the end 62 of the hold-down guide 61 is limited by screw 70.

The opposite or outer end of the hold-down guide 61 is pivotally connected at 72 to one end of a link 73 that extends upwardly from pivot 72 in generally the same direction as arm 66.

The upper end of link 73 is, in turn, pivotally connected by a pivot 74 with the lower end of an arm 75, which arm 75 is similar to arm 66, but arm 75 extends generally toward the upper end of arm 66, and the upper end of arm 75 is pivotally supported on a pivot 76 that is alongside pivot 67 and that is also secured to plate 68.

Said upper end of arm 75 has an arm 77 thereon, and arm 77 projects toward arm 69 that is secured to the upper end of arm 66.

A vertical screw 78, similar to screw 70, threadedly extends through the bracket 71 and into engagement with the outer end of arm 77, thereby limiting the upward movement of the arm 77.

Parallel, downwardly projecting arms 80 are respectively connected with arms 66, 75 and project downwardly relative to pivots 67, 76 at right angles to arms 69, 77, and the lower ends of these arms 80 are connected by a spring 81 that yieldably urges arms 66, 75 toward each other, which action, in turn, yieldably holds the arms 69, 77 against the screws 70, 78.

Another coil spring 82 connects the pivots 65, 72 that connect the ends of the hold-down guide 61 with the lower end of arm 66 and with the lower end of link 73.

By adjusting the screws 70, 78 the position of the hold-down guide 61 relative to the cutter 50 may be varied to suit conditions, and one end of the guide strip may be adjusted relative to the other and to said cutter.

The arrangement and the structure described enables the guide strip 61 to not only rock about different axes that are parallel to the axis of rotation of wheels 45, but to combine the rocking action with bodily movement of the strip toward and away from the wheel. Such movement actually is a floating action resisted by the yieldable influence of the springs 81, 82, and it enables the mantenance of effective contact between drupes of different shapes and diameters as they are carried by wheel 45 between the hold-down strip and wheels in the direction of rotation of the latter.

It should be noted that in the present combination, the movement of the hold-down strip is relative to the cutter 50, the latter being stationary, except for its rotary movement.

The positive delivery of oriented drupes onto the wheels 45 and below the receiving, or entry end 62 of the hold-down strip 61 without interference from the cutter 50 is accomplished by having the drupes carried between belts 17 to said entry end of the hold-down strip free from any lower support, such as otherwise might be provided by belt 4.

*Operation*

In operation, assuming apricots to be the drupes to be bisected and pitted, the said apricots are delivered by any suitable means onto the left hand end of belt 4 and between the adjacent runs of belts 10. This can be by any suitable conventional means, such as a conveyor or chute or other feed means.

The space between the adjacent sides of the belts 10 at pulleys 11 is wider than the maximum diameters of the apricots, but upon being deposited on belt 4, the apricots will be carried to the right (as seen in FIGS. 1, 2) and will quickly be engaged at their opposite sides by the opposed sides of the slower moving belts 10. The belts 10 continue to be slightly convergent in direction from left to right, or toward the pulleys 14.

Apricots, generally, have their maximum diameters in the plane of their sutures, and the pits correspond. In pitting them, it is desirable that the body of each apricot be bisected in the plane of its suture.

The differential in speed between belt 4 and belts 10 results in the apricots positioning themselves between belts 10 so their sutures are in a vertical plane extending longitudinally of belt 4 and midway between belts 10. This is the same as described in said U.S. Patent 2,745,453.

Upon the apricots reaching the right hand end of the feed and orienting portion 1 they will be oriented, and in their oriented positions they will be delivered to the transfer portion 2, which comprises belts 10 and a portion of belt 4.

Upon each apricot reaching the terminating right hand end of belt 4, it will be yieldably held between belts 17 and can rotate about a horizontal axis that is perpendicular to the lengths of belts 17. There is nothing engaging either the upper or lower sides of the apricots until they are carried to a position substantially directly over the cutter 50 and below the entry end portion 62 of guide strip 61, and at that position the lower side of the apricot (at opposite sides of cutter 50) will engage the surfaces 49 of the wheels 45, to effect a rotation of the apricot about its said horizontal axis.

Since the apricot is moved to between the cutter 50 and hold-down guide strip 61 along a line tangential to the cutting edges of the cutter, the latter will initially cut into the lower generally leading surface of the apricot and the apricot will quickly rotate to complete bisection of the body.

The sides of the inverted V-shaped guide strips in combination with the oppositely slanted upper surfaces of the rims 48 on wheels 45 will hold the body of the apricot together during bisection with the cut faces of the bisected halves at opposite sides of the plane of the cutter 50.

Cutter 50 is revolving at a relatively high rate of speed in the same direction as the wheels 45, and which rate is much greater than the rate at which wheels 45 or belts 17 are moved. Consequently, as soon as the apricot is so positioned on wheels 45 that either of the circumferentially facing surfaces 54 on the cutter 50 will engage the trailing end of the pit, the latter is positively and very rapidly moved out of the generally leading end of the bisected apricot, along a line that extends generally downwardly and substantially tangentially of the outer periphery of the cutter. This action is very fast and positive. There is no possible clinging of the pit in either of the halves, and there is no injury to the fruit halves.

The bisected halves, once clear of the guide strip 61 will drop onto a conveyor or chute 90 for being carried to any desired point.

In FIG. 5 it may be noted that the belts 17 actually pass over the wheels 45, and they cooperate with the hold-down guide strip 61 and the upper surfaces of the rims 48 to form a substantially enclosed passageway 91 (FIG. 5) between the upper, lower and lateral sides of which the apricot is held at the point where the latter is delivered onto the wheels 45. And it is at this point where rotation of the apricot very rapidly occurs, and where complete bisection is effected upon substantially one half a revolution of each apricot, and the direction of which revolution is such that the pit will always be moved out of a precut portion.

I claim:
1. The method of pitting a whole freestone drupe that comprises the steps of:
 (a) moving said drupe in one direction along a generally horizontally extending path of travel whereby the pit within said drupe will have a leading end and a trailing end during said movement;
 (b) cutting into the lowermost side of the body of said drupe substantially to the pit thereof during said movement;

(c) entering the cut portion of said body from said trailing end thereof (d) engaging the trailing end of the pit within said drupe; and (e) moving said pit out of the leading end of said drupe, relative to the direction of movement of said drupe at the time of said engagement with the said trailing end of said pit, all while said drupe is moving in said one direction.

2. The method of pitting a whole freestone drupe that includes the steps of:

(a) moving said drupe in one direction in a predetermined path of travel, (b) bisecting the body of said drupe substantially to the pit thereof at a point in said path while said drupe is moving in said one direction and at substantially the same time (c) knocking the pit out of the leading side of said bisected body by impact against the end of the pit that is opposite to said leading side.

References Cited by the Examiner

UNITED STATES PATENTS

| | | | |
|---|---|---|---|
| 1,794,479 | 3/1931 | Smith | 146—238 |
| 2,417,174 | 3/1947 | Prenveille | 146—28 |
| 2,517,342 | 8/1950 | Pesch | 146—28 |
| 2,519,643 | 8/1950 | Garrigue et al. | 146—28 |
| 2,735,465 | 2/1956 | Kellogg | 146—28 X |
| 2,745,453 | 5/1956 | Perrelli et al. | 146—28 |
| 2,826,228 | 3/1958 | Perrelli et al. | 146—28 |
| 2,924,259 | 2/1960 | Magnuson | 146—238 |
| 2,929,424 | 3/1960 | Amori | 146—238 X |
| 3,087,522 | 4/1963 | Ciraolo | 146—28 X |

ROBERT C. RIORDON, *Primary Examiner.*

CARL W. ROBINSON, J. SPENCER OVERHOLSER,
*Examiners.*